US007713445B2

(12) United States Patent
Gros

(10) Patent No.: US 7,713,445 B2
(45) Date of Patent: *May 11, 2010

(54) MIXTURE FOR APPLYING A NON-CORROSIVE, THIN POLYMER COATING WHICH CAN BE SHAPED IN A LOW-ABRASIVE MANNER, AND METHOD FOR PRODUCING THE SAME

(75) Inventor: Georg Gros, Oppenau (DE)

(73) Assignee: Chemetall GmbH, Frankfurt (DE)

( * ) Notice: Subject to any disclaimer, the term of this patent is extended or adjusted under 35 U.S.C. 154(b) by 581 days.

This patent is subject to a terminal disclaimer.

(21) Appl. No.: 10/511,223

(22) PCT Filed: Apr. 17, 2003

(86) PCT No.: PCT/EP03/04055

§ 371 (c)(1),
(2), (4) Date: Dec. 21, 2004

(87) PCT Pub. No.: WO03/089529

PCT Pub. Date: Oct. 30, 2003

(65) Prior Publication Data

US 2005/0161641 A1 Jul. 28, 2005

(30) Foreign Application Priority Data

| Apr. 20, 2002 | (DE) | ................................ | 102 17 624 |
| Oct. 12, 2002 | (DE) | ................................ | 102 47 691 |
| Dec. 3, 2002 | (DE) | ................................ | 102 56 286 |

(51) Int. Cl.
- C09D 5/10 (2006.01)
- C09D 5/08 (2006.01)
- B05D 1/12 (2006.01)
- H01B 1/22 (2006.01)

(52) U.S. Cl. .................... 252/500; 252/512; 252/518.1; 252/519.3; 428/323; 428/208; 428/353; 428/423.1; 427/180; 427/202; 427/205; 427/384; 427/386; 219/91.21; 204/488

(58) Field of Classification Search ................ 252/500, 252/511; 106/14.05, 403, 404; 427/388.1, 427/327; 428/328, 469
See application file for complete search history.

(56) References Cited

U.S. PATENT DOCUMENTS

| 3,175,991 | A |   | 3/1965  | Morris et al. |  |
| 3,562,124 | A | * | 2/1971  | Leon et. al. ................ | 428/328 |
| 3,849,141 | A |   | 11/1974 | Palm et al. |  |
| 3,884,705 | A |   | 5/1975  | Blair |  |
| 3,904,555 | A | * | 9/1975  | Matsuda et al. ............. | 252/503 |
| 3,990,437 | A |   | 11/1976 | Boyden et al. |  |
| 4,070,323 | A |   | 1/1978  | Vanderhoff et al. |  |
| 4,139,385 | A |   | 2/1979  | Crivello |  |
| 4,213,837 | A |   | 7/1980  | Bristowe et al. |  |
| 4,228,438 | A |   | 10/1980 | Vazirani |  |
| 4,626,283 | A |   | 12/1986 | Martins et al. |  |
| 4,628,004 | A |   | 12/1986 | Nickola et al. |  |
| 4,724,172 | A | * | 2/1988  | Mosser et al. ............. | 427/383.5 |
| 4,794,050 | A | * | 12/1988 | Campbell et al. ........... | 428/551 |
| 4,851,460 | A |   | 7/1989  | Stranghoner et al. |  |
| 4,876,160 | A |   | 10/1989 | Shindou et al. |  |
| 4,889,773 | A |   | 12/1989 | Campbell et al. |  |
| 4,896,250 | A |   | 1/1990  | Sullivan |  |
| 4,939,034 | A | * | 7/1990  | Sobata et al. ............... | 428/336 |
| 4,981,759 | A | * | 1/1991  | Nakatani et al. ............ | 428/626 |
| 4,996,085 | A |   | 2/1991  | Sievers |  |
| 5,001,173 | A |   | 3/1991  | Anderson et al. |  |
| 5,069,966 | A |   | 12/1991 | Colaiacovo et al. |  |
| 5,071,593 | A |   | 12/1991 | Takahashi et al. |  |

(Continued)

FOREIGN PATENT DOCUMENTS

AU 742771 5/1999

(Continued)

OTHER PUBLICATIONS

Data Sheet for AL-135.*
U.S. Appl. No. 10/511,222, filed Oct. 13, 2004, Gros et al.
U.S. Appl. No. 09/980,182, filed Jan. 7, 2002, Gros et al.
U.S. Appl. No. 10/467,927, filed Oct. 30, 2003, Gros et al.
U.S. Appl. No. 10/511,242, filed Oct. 13, 2004, Gros et al.
Schaeffer "Radiation curable oligomers combining superior wear properties with enhanced chemical and moisture resistance", Sartomer Company, Inc. (Jul. 2005).

*Primary Examiner*—Stanley Silverman
*Assistant Examiner*—Kallambella Vijayakumar
(74) *Attorney, Agent, or Firm*—Fulbright & Jaworski LLP

(57) ABSTRACT

The invention relates to a mixture for applying a thin polymer, especially less than 6 μm, non-corrosive, electroconductive or semiconductive coating which can be shaped in a low-abrasive manner, to a base. Said mixture contains A) electroconductive and/or semiconductive elements/compounds selected from the group of a) electroconductive and/or semiconductive particles having a particle size distribution with a transfer value $d_{80}$ which is less than or equal to 6 μm, b) electroconductive and/or semi-conductive polymer compounds, and c) electroconductive and/or semiconductive compounds containing amine and/or ammonium, B) at least one binding agent optionally containing reactive thinning agents, C) at least one crosslinking agent and/or at least one photoinitiator, D) optionally at least one constituent selected from d) post-crosslinking compounds, e) additives, f) anticorrosion pigments, and g) non-particulate corrosion inhibitors, and optionally E) an organic solvent and/or water, the sum of all of the conductive and/or semiconductive elements/compounds A) amounting to between 0.5 and 70 wt. %, and the particle content a) amounting to between 0 and 60 wt. %. The invention also relates to a method for producing a non-corrosive, viscoplastic coating on a base, said coating containing polymer and inorganic particles, and to an electroconductive or semiconductive coating containing polymer and inorganic particles.

35 Claims, No Drawings

U.S. PATENT DOCUMENTS

| | | | |
|---|---|---|---|
| 5,073,585 | A | 12/1991 | Neubert |
| 5,126,768 | A | 6/1992 | Nozawa et al. |
| RE34,116 | E | 10/1992 | Shindou et al. |
| 5,213,846 | A * | 5/1993 | Tsuneta et al. ............ 427/386 |
| 5,260,120 | A | 11/1993 | Moyle |
| 5,274,021 | A * | 12/1993 | Geeck et al. .............. 524/417 |
| 5,336,303 | A | 8/1994 | Cocks |
| 5,501,942 | A | 3/1996 | Salvin et al. |
| 5,532,025 | A | 7/1996 | Kinlen et al. |
| 5,578,669 | A * | 11/1996 | Odawa et al. ............. 524/414 |
| 5,594,065 | A | 1/1997 | Tien et al. |
| 5,700,398 | A * | 12/1997 | Angelopoulos et al. .... 252/500 |
| 5,712,034 | A | 1/1998 | Stevens et al. |
| 5,750,249 | A | 5/1998 | Walther et al. |
| 5,753,740 | A | 5/1998 | Odawa et al. |
| 5,834,128 | A | 11/1998 | Hamahara et al. |
| 5,853,890 | A | 12/1998 | Odawa et al. |
| 5,855,820 | A | 1/1999 | Chan et al. |
| 5,922,119 | A | 7/1999 | Gijsbert |
| 5,976,419 | A * | 11/1999 | Hawkins et al. ........... 252/512 |
| 6,001,469 | A | 12/1999 | Verardi et al. |
| 6,008,462 | A * | 12/1999 | Soltwedel ................ 219/91.2 |
| 6,054,514 | A * | 4/2000 | Kulkarni ................... 524/111 |
| 6,146,706 | A | 11/2000 | Verardi et al. |
| 6,156,416 | A | 12/2000 | Daems et al. |
| 6,211,262 | B1 | 4/2001 | Mejiritski et al. |
| 6,284,817 | B1 | 9/2001 | Bennington et al. |
| 6,332,291 | B1 | 12/2001 | Flosbach et al. |
| 6,472,026 | B1 * | 10/2002 | Maag et al. ................. 427/492 |
| 6,479,102 | B1 | 11/2002 | Hunter et al. |
| 6,479,103 | B1 * | 11/2002 | Wichelhaus et al. ........ 427/327 |
| 6,605,669 | B2 | 8/2003 | Awokola et al. |
| 6,620,308 | B2 | 9/2003 | Gilbert |
| 6,715,196 | B2 * | 4/2004 | Reising et al. ................ 29/458 |
| 6,716,891 | B1 | 4/2004 | Meisenburg et al. |
| 6,740,365 | B2 | 5/2004 | Awokola et al. |
| 6,747,088 | B1 | 6/2004 | Meisenburg et al. |
| 6,794,422 | B1 | 9/2004 | Bruchmann et al. |
| 6,835,459 | B2 | 12/2004 | Lorenz et al. |
| 6,855,403 | B2 | 2/2005 | Tysak |
| 7,022,175 | B2 * | 4/2006 | Marten ...................... 106/403 |
| 7,118,690 | B2 | 10/2006 | Wessling et al. |
| 7,312,255 | B2 | 12/2007 | Gros |
| 2001/0031367 | A1 | 10/2001 | Gilbert |
| 2002/0088373 | A1 | 7/2002 | Marten |
| 2003/0143078 | A1 | 7/2003 | Benedetto et al. |
| 2003/0175541 | A1 | 9/2003 | Lorenz et al. |
| 2004/0013815 | A1 | 1/2004 | Gros |
| 2005/0186442 | A1 | 8/2005 | Gros |
| 2006/0011893 | A1 | 1/2006 | Gros |
| 2006/0058423 | A1 | 3/2006 | Gros et al. |

FOREIGN PATENT DOCUMENTS

| | | |
|---|---|---|
| AU | 742771 A1 | 5/1999 |
| CA | 2305563 | 8/2000 |
| DE | 26 10 437 | 9/1976 |
| DE | 34 12 234 A1 | 10/1985 |
| DE | 37 27 112 A1 | 2/1989 |
| DE | 196 18 435 C1 | 5/1997 |
| DE | 197 48 764 A1 | 5/1999 |
| DE | 197 48 764 A4 | 5/1999 |
| DE | 198 18 735 A1 | 10/1999 |
| DE | 199 47 522 A1 | 4/2001 |
| DE | 199 51 133 A1 | 4/2001 |
| DE | 199 51 133 A3 | 4/2001 |
| DE | 100 22 075 A1 | 11/2001 |
| DE | 100 22 075 A2 | 11/2001 |
| DE | 100 58 018 A1 | 5/2002 |
| DE | 100 58 018 A5 | 5/2002 |
| DE | 100 58 118 A | 5/2002 |
| EP | 0 081 323 | 6/1983 |
| EP | 0 104 838 A2 | 4/1984 |
| EP | 0 298 409 B1 | 1/1989 |
| EP | 0 309 286 A2 | 3/1989 |
| EP | 0 328 047 | 8/1989 |
| EP | 0 344 129 B1 | 11/1989 |
| EP | 0 545 605 A2 | 6/1993 |
| EP | 0 659 855 A2 | 6/1995 |
| EP | 0 742 239 A1 | 11/1996 |
| EP | 0 761 320 B1 | 3/1997 |
| GB | 2 040 977 | 9/1980 |
| JP | 50-45740 | 4/1975 |
| JP | 57-192405 | 11/1982 |
| JP | 10-249357 * | 9/1998 |
| WO | WO 89/05476 | 5/1989 |
| WO | WO-96 29372 A | 9/1996 |
| WO | WO 97/35937 | 10/1997 |
| WO | WO 98/51746 | 11/1998 |
| WO | WO 99/24545 * | 5/1999 |
| WO | WO 99/26728 A2 | 6/1999 |
| WO | WO 00/73395 A1 | 12/2000 |
| WO | WO 01/23453 | 4/2001 |
| WO | WO 01/30923 A2 | 5/2001 |
| WO | WO-01/30923 A2 | 5/2001 |
| WO | WO-02/42352 A2 | 5/2002 |

* cited by examiner

MIXTURE FOR APPLYING A NON-CORROSIVE, THIN POLYMER COATING WHICH CAN BE SHAPED IN A LOW-ABRASIVE MANNER, AND METHOD FOR PRODUCING THE SAME

This is a §371 of PCT/EP03104055 filed Apr. 17, 2003, which claims priority from German 102 17 624.8 filed Apr. 20, 2002, German 102 47 691.8 filed Oct. 12, 2002 and German 102 56 286.5 filed Dec. 3, 2002, all of which are hereby incorporated by reference in their entireties.

The present invention relates to a mixture for applying a thin polymeric, corrosion-resistant, electrically conductive or semiconducting coating which can be shaped in a low-abrasive manner to a substrate, in particular a metallic substrate, such as e.g. a steel sheet, which has optionally been coated beforehand with zinc or a zinc-containing alloy and then optionally coated with a pretreatment. The coating is to serve, in particular, as a welding primer.

In mass production, welding primers of the $1^{st}$ generation which, for reasons of corrosion protection, contain chromium are currently employed in automobile construction because to date it is very difficult to employ equivalent and at the same time environment-friendlier constituents instead of chromium-containing compounds in corrosion protection. The electrical conductivity of the polymeric coatings, which are about 2.5 to 9 μm thick, which is necessary for electrical welding is acquired by a very high content of pulverulent metallic zinc embedded in a polymeric matrix. However, because of moisture in any polymeric coating, metallic zinc tends to oxidize rapidly, with formation of white efflorescences (white rust). By the oxidation of the zinc powder, however, the corrosion-protective action and the electrical conductivity of the metallic zinc can be gradually used up with progressive formation of white rust. In addition, only certain requirements in respect of electrical weldability are imposed on the welding primers of the $1^{st}$ generation of limited corrosion resistance. It is sufficient if 600 welding points can be set by a welding machine through two steel sheets about 0.5 to 2.0 mm thick, lying on one another and coated on both sides, before the welding electrodes have to be reworked or replaced. The structure of the coatings on the steel sheets in this context typically comprises first a layer of zinc or a zinc alloy about 2 to 7.5 μm thick, a pretreatment layer about 0.01 to 1.0 μm thick on top of this and finally a welding primer layer of a thickness significantly below 10 μm thick. With in each case 3 different coatings applied on one another and in each case double-sided, there are therefore in total 2 sheets with 12 layers to be through-plated for each welding point and a good welded joint to be produced, which is a high requirement.

However, far higher requirements are imposed on welding primer coatings of the $2^{nd}$ generation for use in automobile construction: 1.) The corrosion resistance of a flange of two metal sheets should be higher by a factor of about three, in spite of the absence of chromium, since here it is required that an extremely aggressive corrosion protection alternating test in accordance with VDA 621-415 with 20, instead of only 10, cycles each of a duration of one week with salt spray tests, condensation water tests and recondensation is passed successfully without the appearance of red rust. Over the test duration of 20 weeks, the test has a progressively more severe effect. 2.) During electrical welding, the number of welding points which can be achieved with a welding machine should accordingly be at least 1,200, instead of only 600, before the welding electrodes are replaced or reworked. 3.) For gluing, which is used instead of welding to an ever increasing degree in automobile construction, it is necessary for the requirements of adhesive strength between the substrate and the zinc-containing coating, between the zinc-containing coating and the pretreatment layer, between the pretreatment layer and the welding primer layer and between the welding primer layer and the adhesive layer also to be at least as high as in the case of the $1^{st}$-generation welding primers, the $1^{st}$-generation welding primers often being applied more thinly (2.5 to 3 μm, but then free from electrically conductive hard particles) than the foreseeable $2^{nd}$-generation welding primers because of the high corrosion requirements, and the adhesive strength requirements also increasing with the layer thickness. 4.) Furthermore, it would be advantageous if the welding primers were to prove to be outstanding also with other types of welding instead of resistance welding, since the use of alternative welding technology is also being worked on intensively. It is hoped that by this means the labour-intensive and expensive sealing of hollow cavities and, where appropriate, also the sealing of seams can also be dispensed with using the $2^{nd}$-generation welding primers.

It is moreover necessary that metal sheets which are coated with welding primer and are processed in automobile construction can also be shaped to a relatively high degree without problems. A bordering, beading, deep-drawing or/and pressing in large presses in a low-abrasive manner in which the corresponding tool is not worked off too severely and too rapidly and the welding primer coating should not be destroyed, eroded, torn off or seriously damaged is necessary in particular here. This applies in particular to the inorganic contents in the welding primer which are bonded into an organic matrix.

The publications of the prior art on electrically conductive optionally weldable coatings which comprise at least one resin often describe the use of graphite, carbon black, aluminium, nickel, zinc or/and ferro-alloys, such as e.g. iron phosphides based on mixtures of FeP, $Fe_2P$ and evidently unavoidable impurities. The iron phosphides are conventionally based on Ferrophos® powders from Occidental Chemical Corp. (=OxyChem, formerly Hooker Chem. and Plastics Corp.), of which the grades HRS 2132 and HRS 3095 have an average particle size of 3.3 μm and 2.8 μm respectively, according to the manufacturer, but comprise a considerable content of over-sized particles, which can be seen from the particle size passage value $d_{99}$ of 16 μm and 12 μm respectively. All of the publications known to the Applicant which mention iron phosphide as an additive for coating mixtures are based on these Ferrophos® powders. These powder grades are evidently employed in the non-ground form in all these publications, since grinding operations are at best carried out in a mixture of at least three components, mixing with one another often being of primary importance, while the particle sizes are to be scarcely reduced, if at all. As is known, the grinding operations for the preparation of lacquers and similar coatings are often only mixing processes or grinding operations of comparatively low intensity, since they are usually carried out in an organic suspension with a comparatively low iron phosphide content. Since iron phosphides are hard and brittle, they require vigorous grinding without the presence of any or in the presence of as small an amount as possible of substances which impair the grinding action. Furthermore, grinding of finely divided phosphides is not without risk.

The doctrine of U.S. Pat. No. 6,008,462 is liquid coating compositions for weldable primers which are resistant to sea water and have a content of metallic iron particles.

The introduction to the description of this patent specification describes problems which occur when using iron phosphides in primer coatings and which are also mentioned similarly in U.S. Pat. No. 5,260,120. These include the exceptionally abrasive action of the iron phosphide particles on tools and the high coefficient of friction of such coatings. In these publications, these problems are solved by employing iron particles instead of iron phosphide particles in the primer coating or by additionally applying a thin polymeric topcoat to the coating comprising iron phosphide particles, which is said not to impair the weldability of metal sheets coated in this way too severely.

U.S. Pat. No. 4,889,773 describes electrodes for resistance welding which have a coating of binder and at least one phosphide, preferably based on iron phosphides. This coating is not aimed at the high requirements of welding primer coatings.

The doctrine of U.S. Pat. No. 4,110,117 is coating compositions comprising zinc, aliphatic polyol silicates and in some cases also iron phosphide.

U.S. Pat. No. 4,011,088 protects purely inorganic coatings based on particles of iron phosphide or/and nickel phosphide which are embedded in a water-soluble silicate binder.

The doctrine of U.S. Pat. No. 3,884,705 is coatings which, in addition to so-called ferro-alloys, such as iron phosphide alloys, comprise increased contents of corrosion protection pigments and optionally also zinc dust.

WO 96/29372 relates to compositions which, in addition to binder resin, comprise zinc, graphite and optionally further components, such as e.g. iron phosphide.

In scanning electron microscopy analysis of welding primer coatings on metallic substrates on which the welding primer coating is to have a thickness of less than 9 μm, it is striking that over-sized iron phosphide particles not only lead to a coating which appears inhomogeneous, but also form troublesome peaks which project out of the coating and give rise to severe abrasion during shaping. Initial shaping experiments using iron phosphide powder grades added in the non-ground form showed a considerable abrasion and a lack of suitability for shaping in series production.

There was therefore the object of proposing coatings which are suitable for shaping, e.g. of steel sheets such as are processed, for example, in the automobile industry, in a low-abrasive manner in series production. In spite of the coating on one or even both sides, e.g. 1.) with zinc or a zinc-containing alloy, 2.) with a thin pretreatment layer which is a corrosion protection and an adhesive base for the subsequent primer, and 3.) with a 0.5 to 10 μm thick welding primer coating, these coatings should be sufficiently electrically conductive to be readily weldable. The welding primer coating applied should be able to withstand, without damage or with as little damage as possible, severe shaping such as with deep-drawing of a metal sheet of more than 10 cm, in some cases over relatively narrow radii and more severely also in the pressing direction such as is conventional in the automobile industry on steel sheets, e.g. for engine bonnets and other vehicle body elements, wherein the welding primer film should neither tear off nor be eroded over a relatively large area. The process for producing the welding primer coating should moreover be as simple as possible, suitable for series production and inexpensive. The dry coatings should have a layer thickness of 6 μm or even significantly lower thicknesses, in particular in order to lower the costs of the coatings.

The object is achieved with a mixture for applying a thin polymeric, corrosion-resistant, electrically conductive or semiconducting coating which can be shaped in a low-abrasive manner to a substrate, in particular to a metallic substrate such as e.g. a steel sheet, it being possible for the substrate optionally to be precoated e.g. with at least one zinc layer or/and a zinc-containing alloy layer or/and with at least one pretreatment layer, wherein the mixture comprises A) a content of electrically conductive or/and semiconducting elements/compounds chosen from the group consisting of a) electrically conductive or/and semiconducting particles having a particle size distribution with a $d_{80}$ passage value of $\leq 6$ μm, measured with a Mastersizer of the type S from Malvern Instruments, where, however, not only electrically conductive or/and semiconducting substances based only on particles of iron phosphide or/and metallic zinc and optionally on up to 5 wt.% of graphite or/and molybdenum sulfide are used, of b) electrically conductive or/and semiconducting polymeric compounds, such as e.g. polyanilines or derivatives thereof, and of c) electrically conductive or/and semiconducting amine- or/and ammonium-containing compounds, and B) at least one binder, optionally including reactive diluent(s), and C) in each case at least one crosslinking agent or/and at least one photoinitiator and D) optionally also in each case at least one component chosen from d) post-crosslinking compounds, such as e.g. isocyanates, blocked isocyanates, isocyanurates, melamine resins or/and derivatives thereof, e) additives, f) corrosion protection pigments, such as e.g. phosphates, phosphosilicates or/and silicates, g) corrosion inhibitors which are not present in particle form and optionally E) an organic solvent or/and water, the sum of the weight contents of all of the conductive or/and semiconducting elements/compounds A) being 0.5 to 70 wt. % and the content of electrically conductive or/and semiconducting particles a) of these with a particle size distribution with a $d_{80}$ passage value of $\leq 6$ μm being 0 to 60 wt. %, in each case based on the wet lacquer. The object is preferably based on a preparation of the suspension such as is described in the examples and comparison examples.

The subject matter of the patent applications DE 102 17 624 and DE 102 56 286 is expressly included in this Application in respect of the information on the examples, comparison examples, testing techniques, particle-related data, such as e.g. nature, size, size distributions and properties, and on the properties and compositions of the mixtures and coatings and on the coatings and process steps.

The substrate can be, in particular, one of steel, high-grade steel, of at least one aluminium or/and magnesium alloy, in the form of sheets, plates, rods or parts of complicated shape or already joined components. Sheets of an aluminium alloy or steel are preferred.

The coating can be applied to the substrate to any desired extent, e.g. to only one or to both sides, e.g. of a metal sheet, optionally including at least one edge or only in a certain width or in a certain pattern, so that e.g. edge regions can remain uncoated.

The electrically conductive or/and semiconducting particles a) are water-insoluble or sparingly water-soluble. They serve, inter alia, as barrier particles, without themselves having to be particularly corrosion-resistant. Nevertheless, it is preferable for the particles a) to be somewhat more stable to chemicals or/and more corrosion-resistant, in particular to water and weakly basic media.

However, the composition according to the invention preferably comprises not only electrically conductive or/and semiconducting substances chosen from those based on aluminium, iron phosphide, graphite, molybdenum sulfide or/and zinc, but particularly preferably also at least one further such type of particle. The various stoichiometrically different Fe—P phases are combined under the term iron phosphide, regardless of their particular composition.

In the mixture according to the invention, the sum of the weight contents of all the elements/compounds A) can preferably be 0.8 to 66% of the weight contents, based on the solids content in the wet lacquer, particularly preferably at least 1.5% or at least 4.5%, very particularly preferably at least 8% or at least 14%, in particular at least 26% and particularly preferably not more than 60% or not more than 54%, very particularly preferably not more than 48% or not more than 42%, in particular not more than 36%.

For coatings in particular having an average layer thickness in the range from 2 to 4 μm, the sum of the weight contents of all the elements/compounds A) is preferably 0.5 to 56% of the weight contents, based on the solids content in the wet lacquer, particularly preferably at least 1% or at least 2.5%, very particularly preferably at least 4% or at least 8%, in particular at least 12% and particularly preferably not more than 50% or not more than 44%, very particularly preferably not more than 38% or not more than 32%, in particular not more than 26%.

In the mixture according to the invention, the sum of the weight contents of all the particles a) can preferably make up 0.5 to 56% of the weight contents, based on the solids content in the wet lacquer, particularly preferably at least 1.5% or at least 4.5%, very particularly preferably at least 8% or at least 14%, in particular at least 26% and particularly preferably not more than 50% or not more than 44%, very particularly preferably not more than 38% or not more than 32%, in particular not more than 26%. The lower the content of hard particles a) in the mixture, the more it may be preferable to employ particles a) of better electrical conductivity having a higher electrical conductivity.

On the other hand, as the layer thickness of the dry film decreases, a successive transition may be made rather to a lower content of electrically conductive or/and semiconducting constituents or also rather to less conductive contents, such as e.g. semiconducting constituents, since at a welding primer film thickness of approx. 0.5 μm, the through-weldability is ensured even without a content of electrically conductive constituents, but at this film thickness the corrosion resistance, adhesive strength and resistance towards severe shaping are not ensured independently of possible particle contents and also without a particle content.

These particles a) can include three classes of particles:
Hard particles, often of good electrical conductivity,
Soft or very soft particles which are often capable of sliding,
Metallic particles.

In the mixture according to the invention, the electrically conductive or/and semiconducting particles a) can comprise substances based on compounds or mixtures of compounds with or of spinels, such as e.g. $Fe_3O_4$, $Mn_3O_4$, $FeMn_2O_4$ or/and further substances based on borides, carbides, oxides, phosphates, phosphides, silicates, silicides or particles having an electrically conductive coating or/and a mixture thereof or a common compound thereof, and optionally further metallic particles, including alloys or/and carbon black, chosen from aluminium, iron, cobalt, copper, molybdenum, nickel, niobium, silver, tantalum, titanium, vanadium, tungsten, zinc, tin, aluminium-, iron-, cobalt-, copper-, molybdenum-, nickel-, niobium-, silver-, tantalum-, titanium-, vanadium-, tungsten-, zinc- or/and tin-containing alloys, in particular oxides substantially based on spinels, preferably of aluminium, chromium, iron, cobalt, copper, magnesium, manganese, nickel, vanadium, titanium or/and zinc or/and substantially based on electrically conductive or/and semiconducting oxides having a below-stoichiometric oxygen content, such as e.g. $TiO_{1.95}$, or/and in particular phosphides substantially based on aluminium, iron, cobalt, copper, manganese, molybdenum, nickel, niobium, tantalum, titanium, vanadium, tungsten, zinc or/and tin, in particular based on phosphides, preferably based on iron-, manganese-, nickel- or/and tin-containing phosphides. Particles having an electrically conductive coating which are suitable in particular are those which have an electrical conductivity at least of metallic zinc, in particular particles coated with graphite, carbon black, another type of carbon, electrically conductive metal, iron oxide, antimony compound(s) or/and tin compound(s).

The electrically conductive or/and semiconducting particles a) are chosen, inter alia, in particular from those based on boride, carbide, oxide, phosphide, phosphate, silicate or/and silicide. They are characterized here as "hard" and are preferably such compounds based on aluminium, chromium, iron, calcium, magnesium, manganese, nickel, cobalt, copper, lanthanum, lanthanide, molybdenum, niobium, tantalum, titanium, vanadium, tungsten, yttrium, zinc, tin or/and zirconium. These particles are usually quite hard and often of better electrical conductivity. Their electrical conductivity can optionally be substantially based on a particular doping addition or/and content of a further phase of better electrical conductivity or/and semiconducting properties or/and of a coating of better electrical conductivity. Particularly preferred substances are iron phosphate, manganese phosphate, nickel phosphate, zinc phosphate or/and further phosphates based on aluminium, iron, copper, manganese, nickel, zinc or/and further transition metals, phosphides based on iron, manganese, molybdenum, nickel, titanium, zirconium or/and optionally further transition metals, borides based on titanium or/and other transition metals, carbides, such as e.g. boron carbide, silicon carbide and vanadium carbide, or silicides, such as e.g. based on molybdenum, nitrides, such as e.g. titanium nitride, or/and on other transition metals.

Compounds which are particularly preferred here are oxides of high electrical conductivity, in particular oxides having a structural chemistry based on at least one spinel, such as e.g. $Fe_3O_4$ or $(Cu,Fe,Mn,Ni,Ti,Zn)_3O_4$, based on at least one oxide having a below-stoichiometric oxygen content and of comparatively high electrical conductivity, such as e.g. $SnO_{2-x}$ or $TiO_{2-x}$, where x is e.g. in the range from 0.02 to 0.25, or based on at least one phosphide which, in particular, can be attacked to only a small degree or cannot be attacked by water and dilute acids and has a relatively high electrical conductivity. The graphite is preferably microcrystalline and contains, in particular, more than 97.0 wt. % C.

The mixture according to the invention can also be characterized in that the mixture of all the types of electrically conductive or/and semiconducting hard particles a) has an average particle size $d_{50}$ in the range from 0.1 to 4.5 μm, in particular in the range from 0.2 to 3.5 μm.

Preferably, the content of electrically conductive or/and semiconducting hard particles within the mixture of the electrically conductive or/and semiconducting particles a) is 0 to 90 wt. %, particularly preferably at least 20 wt. %, very particularly preferably at least 40 wt. % and particularly preferably not more than 70 wt. %, very particularly preferably not more than 50 wt. %. At a higher content of electrically conductive or/and semiconducting hard particles a) in the mixture, a harder, stronger, more electrically conductive and usually also more chemically stable coating is achieved, while with a low content of electrically conductive or/and semiconducting hard particles a) in the mixture a softer, less strong, and under certain circumstances less electrically conductive coating is rather achieved.

In the mixture according to the invention, preferably at least 10 wt. %, preferably at least 20 wt. %, particularly preferably at least 30 wt. %, in particular at least 40 wt. % of the electrically conductive or/and semiconducting particles a)

can be those of higher electrical conductivity and higher hardness, above all oxides or/and phosphides substantially based on aluminium, iron, cobalt, copper, manganese, molybdenum, nickel, niobium, tantalum, titanium, vanadium, tungsten, zinc or/and tin, including oxides having a below-stoichiometric oxygen content and having an elevated electrical conductivity, in particular oxides or/and phosphides based on iron-, manganese-, nickel- or/and zinc-containing compounds or mixtures thereof.

Preferably, the content of the electrically conductive or/and semiconducting particles a) based on boride, carbide, phosphate, silicate and silicide is not more than 80 wt. % of all the electrically conductive or/and semiconducting particles a), particularly preferably not more than 65 wt. %, very particularly preferably not more than 50 wt. %, in particular not more than 35 wt. %. However, it may be preferable to adjust the content of iron oxide pigment, in particular such as is known in the lacquer industry, to contents of up to 20 wt. %, particularly preferably to up to 10 wt. %, very particularly preferably to up to 5 wt. %, in particular to no such pigment content at all.

In the mixture according to the invention, the content of very soft or soft particles that are capable of sliding within the mixture of the electrically conductive or/and semiconducting particles a) can preferably be 10 to 100 wt. %, particularly preferably at least 20 wt. %, very particularly preferably at least 30 wt. % and particularly preferably not more than 90 wt. %, very particularly preferably not more than 80 wt. %.

Preferably, the content of sulfides, selenides and tellurides in the mixture is not more than 5 wt. % and particularly preferably not more than 3.5 wt. %, very particularly preferably not more than 2.5 wt. %, based on the weight of the solid in the wet lacquer. If substances are chosen from the electrically conductive or/and semiconducting particles a) which are less corrosion-resistant, especially in the alkaline range, their content should not be too high or should even be zero. At a high content in the mixture of very soft or soft particles that are capable of sliding, a flexible, softer coating which is very readily capable of sliding is formed, while with a particularly low content in the mixture of very soft or soft particles that are capable of sliding a harder, stronger coating which usually also has a better electrical conductivity is established.

The inorganic particles that are capable of sliding chosen from the electrically conductive or/and semiconducting particles a) are preferably those having very good friction properties. They are water-insoluble or sparingly water-soluble. They preferably contain particles having a substantially flat (platelet) or elongate extent (needles, straight-edged particles) or/and substantially corresponding aggregates. In particular, those based on graphite or/and chalcogenide, such as sulfide, selenide or telluride, in particular on graphite, antimony-containing, manganese-containing, molybdenum-containing, bismuth-containing, tungsten-containing or/and tin-containing chalcogenide, above all on manganese sulfide, molybdenum disulfide, tungsten disulfide or/and tin sulfide are preferred. They can also be coated e.g. with carbon or graphite. In the mixture according to the invention, they can be predominantly or entirely of graphite, sulfide, selenide or/and telluride, in particular of graphite, antimony-containing sulfide, tin-containing sulfide, molybdenum sulfide or/and tungsten sulfide. However, elements such as copper or alloys e.g. of copper, zinc or other metals can also be chosen for this.

The very soft or soft particles that are capable of sliding often show out of the coating to a certain amount if they have large particle diameters in comparison with the dry layer thickness of the film and have not been subjected to relatively severe mechanical stresses up until application of the coating, and can be comminuted rapidly during mechanical stress on the coating, such as e.g. during rubbing or shaping, these particles helping as lubricants by themselves alone or in combination with any contents of oil present, such as e.g. deep-drawing oil. It may therefore be preferable to choose among the electrically conductive or/and semiconducting particles a) very soft or soft particles that are capable of sliding which are rather larger than the other particles a).

In the mixture according to the invention, the mixture of all the types of very soft or soft particles that are capable of sliding can have, on addition to the mixture, an average particle size $d_{50}$ in the range from 0.1 to 20 μm, preferably in a range up to 18 μm, particularly preferably in a range up to 15 μm, very particularly preferably in a range up to 12 μm and preferably in a range from at least 1 μm, particularly preferably in a range from at least 3 μm, very particularly preferably in a range from at least 5 μm.

In the mixture according to the invention, the mixture of all the types of very soft or soft particles that are capable of sliding can have, on addition to the mixture, an average particle size $d_{80}$ in the range from 1 to 25 μm, preferably in a range up to 21 μm, particularly preferably in a range up to 16 μm, very particularly preferably in a range up to 12 μm and preferably in a range from at least 1.5 μm, particularly preferably in a range from at least 3.5 μm, very particularly preferably in a range from at least 5 μm.

Platelets are the preferred particle shape of the very soft or soft particles that are capable of sliding. In the mixture according to the invention, the average particle size $d_{50}$ of the very soft or soft particles that are capable of sliding can be, on addition to the mixture, greater by a factor of 1.5 to 7 than the average particle size $d_{50}$ of the other types of electrically conductive or/and semiconducting particles a), preferably greater by a factor of 2 to 6, particularly preferably greater by a factor of 3 to 5.

The metallic particles as the third component group of the electrically conductive or/and semiconducting particles a) are preferably chosen from aluminium, iron, cobalt, copper, manganese, molybdenum, nickel, niobium, tantalum, titanium, tungsten, zinc, tin, zirconium or/and at least one alloy comprising at least one such metal—intermetallic compounds are in principle included in the term alloys in the context of this Application—such as e.g. ferro-alloys, such as, inter alia, FeCr, FeMn, FeSi and FeTi, steel, bronze and brass. It is particularly advantageous in this context to choose, instead of the often corrosion-sensitive metals, such as e.g. aluminium, copper and zinc, alloys of these elements which are suitable in particular in respect of corrosion resistance, such as e.g. ZnMg alloys. In particular, no or not very high contents of ferro-alloys apart from those based on iron phosphide are added, above all not more than 80 wt. %, not more than 55 wt. % or not more than 40 wt. % content of all the elements/compounds A). Alternatively, the metal particles or/and alloy particles can also be coated, it being possible for the particle coating to help to improve the corrosion resistance or/and the electrical conductivity. They are water-insoluble or particularly sparingly water-soluble. They advantageously have a low hardness and high ductility.

Advantageously, in many embodiments not more than 75 wt. % of all the types of electrically conductive or/and semiconducting particles a) are those chosen from metals and alloys, in particular not more than 58 wt. % or not more than 46 wt. %. Preferably, the content in the mixture of very soft or soft particles that are capable of sliding is the same as or greater than the content of metals or alloys or/and carbon black.

In the mixture according to the invention, the mixture of all the types of metallic particles, including alloy particles, can have, on addition to the mixture, a particle size passage value $d_{80}$ in the range from 0.05 to 6 µm, in particular in the range from 0.1 to 5 µm, preferably in a range up to 4.5 µm, particularly preferably in a range up to 4 µm and preferably in a range from at least 0.5 µm, particularly preferably in a range from at least 0.8 µm. In this context, higher contents are preferably chosen only for softer constituents. On the other hand, particles of graphite or/and carbon black can have, on addition to the mixture, a particle size passage value $d_{80}$ in the range from 0.01 to 25 µm.

In the mixture according to the invention, the mixture of all the types of metallic particles, including alloy particles, graphite or/and carbon black, can have, on addition to the mixture, an average particle size $d_{50}$ in the range from 0.01 to 10 µm, preferably in a range up to 8 µm, particularly preferably in a range up to 5 µm, very particularly preferably in a range up to 4 µm and preferably in a range from at least 0.1 µm, particularly preferably in a range from at least 0.3 µm, very particularly preferably in a range from at least 0.5 µm. Platelets are also the preferred particle shape of the metallic particles (including alloys), graphite or/and carbon black. Nanoparticles can also be employed in this context. It is particularly preferable for at least some of these metallic particles to comprise alloy particles, preferably at least 20 wt. % of all of these metallic particles, particularly preferably at least 40 wt. %, very particularly preferably at least 60 wt. %, above all to comprise entirely alloy particles, the alloys preferably comprising only aluminium-, magnesium-, titanium- or/and zinc-containing alloys that are significantly more corrosion-resistant than aluminium, magnesium, titanium, zinc or another metal which is the main constituent of this alloy.

In the mixture according to the invention, the average particle size $d_{50}$ of the metallic particles, including alloy particles, graphite or/and carbon black, can be, on addition to the mixture, greater by a factor of 0.1 to 4 than the average particle size $d_{50}$ of the electrically conductive hard particles, preferably greater by a factor of 2 to 6, particularly preferably greater by a factor of 3 to 5.

In the mixture according to the invention, the content of metallic particles, including alloy particles, graphite or/and carbon black, in the mixture of all the types of electrically conductive or/and semiconducting particles a) can be, in particular, 0 to 75 wt. %, based on the weight of the solid in the wet lacquer. Preferably, this content is at least 0.1 wt. % and not more than 70 wt. %, based on the weight of the solid in the wet lacquer, particularly preferably at least 1 wt. % and not more than 65 wt. %, very particularly preferably at least 2 wt. % and not more than 60 wt. %.

At a high content of metallic particles, including alloy particles, graphite and carbon black, in the mixture of all the types of electrically conductive or/and semiconducting particles a), a softer, often less electrically conductive and usually also less chemically stable coating is formed, while with a particularly low content of metallic particles or carbon black in the mixture a harder, stronger, usually more electrically conductive and often more chemically stable coating is achieved.

The substance of at least one or at least one of several substances from the category of the electrically conductive or/and semiconducting particles a) preferably has, in the massive state at room temperature, an electrical resistance of not more than 1,000 mΩ·cm, particularly preferably of not more than 500 mΩ·cm, very particularly preferably of not more than 50 mΩ·cm. In particular, the electrical resistance can be no less than, or in the case of films below 5 µm thick, no more than 2 powers of ten less than that of commercially available iron phosphide mixtures based on FeP and $Fe_2P$, including impurities.

However, the electrically conductive or/and semiconducting particles a) do not have to have high-performance friction properties. At least some of the particle types involved among the electrically conductive or/and semiconducting particles a) preferably have a Mohs hardness, measured on large crystals or on compact components, of at least 3, preferably of at least 4 or at least 4.5, particularly preferably of at least 5, in particular of at least 5.5.

Preferably, the passage value $d_{80}$ of the mixture of all the types of electrically conductive or/and semiconducting particles a) is not more than 5.5 µm, particularly preferably not more than 5 µm, very particularly preferably not more than 4.5 or 4 µm, above all not more than 3.5 or 3 µm. The passage value $d_{80}$ of the electrically conductive or/and semiconducting particles a) is advantageously in the range from 0.5 to 5.8 µm, particularly preferably in the range from at least 1.5 µm and up to 4.5 µm, very particularly preferably in the range from at least 1.8 µm and up to 3.5 µm, above all in the range from at least 2 µm and up to 4 µm.

In the mixture according to the invention, the mixture of all the types of electrically conductive or/and semiconducting particles a) can have, in particular, an average particle size $d_{50}$ of not more than 2.6 µm or not more than 2.2 µm; this is preferably in the range from 0.1 to 2.5 µm, very particularly in the range from 0.2 to 2 µm. Preferably, it is in a range up to 1.8 µm, particularly preferably in a range up to 1.6 µm, very particularly preferably in a range up to 1.4 µm and preferably in a range from at least 0.5 µm. Platelets, straight-edged or/and substantially isometric particles are the preferred particle shape of the electrically conductive or/and semiconducting particles.

The size of the mixture of all of the electrically conductive or/and semiconducting particles a), based on the passage value $d_{10}$, is advantageously not more than 1.5 µm, in particular not more than 1.2 µm, very particularly preferably not more than 0.8 µm.

In the mixture according to the invention, the mixture of all the types of electrically conductive or/and semiconducting particles a) can preferably have a steep particle size distribution in which the passage value $d_{80}$ to the passage value $d_{10}$, is at most a factor of 12. This factor is in particular at most the factor 11, particularly preferably at most 10, very particularly preferably at most 9, above all at most 8.

All particle size determinations from an average particle size of 0.3 µm are based on distributions measured with a Mastersizer of type S from Malvern Instruments. The suspension with the particles to be measured was prepared here in accordance with the information in the examples and comparison examples. For determinations below an average size of 0.3 µm, measurements or evaluations from photographs that have been obtained with a scanning electron microscope on particles well-distributed on a support are preferably to be used. In the case of larger accumulations recognizable as agglomerates, the particles should be counted here separately as many individual particles and not as individual agglomerates and at least 400 particles should be taken into account in order to be able to determine approximate distributions.

In the process according to the invention, the electrically conductive or/and semiconducting particles a) are preferably ground alone by themselves. Grinding can be carried out here separately for each particle type a) or in part mixtures or in a total mixture of all the types of particles a). In the process according to the invention, the over-sized particles can predominantly be comminuted during grinding of the electrically conductive or/and semiconducting particles a), so that a narrower particle size distribution arises. A steep particle size distribution in particular of the hard powders a), if these make up a high content of the pigmentation, contributes substantially to a uniform particle distribution within the finished coating. It is particularly advantageous if a narrower particle size distribution is established by the grinding of the electrically conductive or/and semiconducting particles a), especially if the very fine particles are scarcely comminuted or if the powder is not ground to dust by this means. In one variant, it is particularly preferable to adjust the particle size distribution to a narrower distribution by grinding only for the particle types of the electrically conductive or/and semiconducting hard particles a) of which the average particle size is greater than 1 μm, very particularly preferably greater than 2 μm.

If a mixture of various electrically conductive or/and semiconducting particles a) should be present, it may be of interest to grind either only the mixture or/and the individual particle grades separately. Grinding of these particles or this particle mixture a) is preferably particularly intensive, in particular using specific grinding units. It may be of interest here to choose a grinding unit which is not normally employed in the lacquer industry because in the lacquer industry usually only relatively low-intensity grinding is carried out, that is to say conventionally only a mixture of soft or/and hard substances or a mixture of polymeric or/and inorganic substances, which are not necessarily in particle form, is ground and the grinding conditions for hard particles for this reason alone are of relatively low intensity. Suitable grinding units and grinding processes are known in particular from powder metallurgy and from industrial ceramics.

Preferably, the at least one corrosion protection pigment g) optionally present has an average particle size which is also about the size of the average particle size $d_{50}$ of the pigment a) ($d_{50}\pm 1$ μm) or slightly below this ($d_{50}-1$ μm). These properties also can in some cases contribute substantially towards establishing a uniform particle distribution within the finished coating.

In contrast to the particles a), the corrosion protection pigments f) can have a limited water-solubility or/and water-soluble contents. It is moreover preferable, especially in the presence of phosphide, for at least one inorganic or/and organic corrosion inhibitor g) also to be employed, but instead at least one corrosion protection pigment f) may also be sufficient for this purpose. A corrosion protection pigment f) based on phosphates, such as e.g. aluminium, alkaline earth metal or zinc phosphate, or/and based on alkaline earth metal carbonate, alkaline earth metal silicate or/and alkaline earth metal phosphosilicate is particularly preferred.

In the mixture according to the invention, the mixture of all the types of corrosion protection particles f) can have, on addition to the mixture, a particle size passage value $d_{80}$ in the range from 0.03 to 6 μm, preferably in a range up to 5.5 μm, particularly preferably in a range up to 5 μm, very particularly preferably in a range up to 4.5 μm and preferably in a range from at least 0.1 μm, particularly preferably in a range from at least 0.3 μm, very particularly preferably in a range from at least 0.5 μm. Furthermore, it is advantageous if the particle size passage value $d_{90}$ of the corrosion protection particles f) is no greater than or not substantially greater than the particle size passage value $d_{99}$ of the electrically conductive or/and semiconducting particles a).

In the mixture according to the invention, the mixture of all the types of corrosion protection particles f) can have, on addition to the mixture, an average particle size $d_{50}$ in the range from 0.01 to 5 μm, preferably in a range up to 4 μm, particularly preferably in a range up to 3 μm, very particularly preferably in a range up to 2 μm and preferably in a range from at least 0.05 μm, particularly preferably in a range from at least 0.1 μm, very particularly preferably in a range from at least 0.3 μm. Furthermore, it is advantageous if the average particle size of all the types of corrosion protection particles f) is the same as or not substantially smaller than the average particle size of the electrically conductive or/and semiconducting hard particles a). It is preferable to distribute the corrosion protection particles f) homogeneously in the mixture and the coating formed therefrom. The corrosion protection particles f) can build up a barrier for e.g. hydrogen ions and are consumed during corrosion no differently than sacrificing corrosion agents, such as e.g. metallic manganese or zinc. Above all platelets are the preferred particle shape of the corrosion protection pigment particles f).

The addition of a corrosion inhibitor g) e.g. based on amides, amines, butanoic acid derivatives, imines or/and organic or inorganic titanates or/and zirconates is also preferred. The corrosion protection pigments f) and the corrosion inhibitors g) are known in principle.

In particular, the content of corrosion protection particles f) relative to the total content of the water-insoluble or sparingly water-soluble pigmentation of all the types of particles a) is 0.4 up to 65%, preferably at least 1% and up to 60%, particularly preferably at least 2% and up to 55%.

It is advantageous here if the sum of the weight contents of the water-insoluble or sparingly water-soluble pigmentation of all the types of particles a) relative to the sum of the total pigmentation $\Sigma(a)+f)$) in the mixture is 30 to 99 wt. %. Preferably, it is 50 to 98 wt. %, particularly preferably at least 70 wt. % and up to 97 wt. %, very particularly preferably at least 90 wt. % and up to 96 wt. %.

A mixture in which the content of electrically conductive or/and semiconducting hard particles is 0 to 68 wt. %, the content of very soft or soft particles that are capable of sliding is 0 to 6 wt. %, the content of metallic, soft or hard, electrically conductive or/and semiconducting particles, graphite or/and carbon black is 0 to 16 wt. % and the content of corrosion protection pigment f) is 0.5 to 12 wt. %, in each case based on the weight of the solid in the wet lacquer, is very particularly preferred. A mixture in which the content of electrically conductive hard particles is 52 to 62 wt. %, the content of very soft or soft particles that are capable of sliding is 0 to 4 wt. %, the content of metallic, soft or hard, electrically conductive or/and semiconducting particles, graphite or/and carbon black is 0 to 12 wt. % and the content of corrosion protection pigment f) is 1 to 8 wt. %, in each case based on the weight of the solid in the wet lacquer, is particularly preferred. Under certain circumstances, the content of particles of metallic, soft or hard, electrically conductive or/and semiconducting particles, graphite or/and carbon black is at least 0.1 wt. %.

Preferably, the total content of the pigmentation $\Sigma(a)+f)$) relative to the total content of solid in the wet lacquer is 10 to 63 wt. %, particularly preferably 15 to 57 wt. %, very particularly preferably 20 to 51 wt. %.

The solids contents of the liquid mixture remain practically identical from the wet lacquer via the dry film to the finished crosslinked coating produced therefrom. The solids contents of the mixture can therefore be regarded as the same as in the finished coating. If carbonate or similar substances with optionally volatile contents are to be used, this is to be taken into account accordingly.

Furthermore, at least one electrically conductive or/and semiconducting polymeric compound b), e.g. at least one conductive polymer, such as e.g. polyaniline(s), polypyrrole(s), polythiophene(s) or/and (a) derivative(s)

thereof, can also be added as an electrically conductive or/and semiconducting component alternatively to at least one particle type a) or/and to at least one conductive or semiconducting compound c) or/and in addition to these. The content of the compounds b) can be in the range from 0 to 40 wt. % in the mixture, based on the solids content in the wet lacquer, preferably in the range from 1 to 25 wt. %, particularly preferably in the range from 2 to 15 wt. %, in particular up to 12 wt. %, up to 8 wt. % or less than 5 wt. %. The use of so-called conductive polymer has the advantages that the coating can be made to be of lower abrasion or largely abrasion-free, since as with the compounds c), a lower content of particles can therefore be used without the coating produced therewith having to have a lower electrical conductivity. Furthermore, on the basis of the replacement of some of the particles which are considerably harder compared with organic substances, the coating can also be made to be more elastic and adhesive, since these substances in some cases can be bonded into the polymeric matrix better than particles. This effect can also be achieved by addition of the compounds c) alternatively or in addition to the compounds b) or intensified still further in this manner.

Furthermore, at least one electrically conductive or semiconducting compound c), in particular an organic compound, e.g. at least one tertiary amine, one ammonium compound or/and derivatives thereof, can also be added as an electrically conductive or/and semiconducting component alternatively to at least one particle type a) or/and to at least one conductive or semiconducting polymeric compound b) or/and in addition to these. The content of compounds c) can be in the range from 0 to 40 wt. % in the mixture, based on the solids content in the wet lacquer, preferably in the range from 1 to 25 wt. %, particularly preferably in the range from 2 to 15 wt. %, in particular up to 12 wt. % or up to 8 wt. %.

In the mixture according to the invention, in certain embodiment variants it may be advantageous if a content of organic lubricant, such as e.g. based on polyethylene wax, ethylene oxide, polypropylene or/and paraffin is added. Preferably, the mixture according to the invention will comprise not more than 1.5 wt. % of wax or/and of substances having wax-like properties, in particular not more than 0.6 or 0.2 wt. %, based on the dry weight of the wet lacquer, particularly preferably no wax and no substances having wax-like properties. At contents between 0.1 and 0.5 wt. %, these substances often already lead to an impairment of the adhesion or cohesion with subsequently applied coatings, such as e.g. further lacquer layers or adhesives, such as e.g. epoxy resin adhesives or adhesives of adhesive films. If gluing is not to be carried out, in particular, the content of organic lubricant can also be increased.

Binders which can be employed are in principle all types of the known binders or binder systems, in particular those which render possible a good water resistance, resistance to organic solvents (methyl ethyl ketone resistance), resistance to alkali, elasticity and adhesive strength to the substrate, in particular binder systems with a binder based on acrylate, epoxide, polyester, isocyanate, isocyanurate or melamine resin. For coating of metal sheets on fast-running belt installations it is advantageous to employ particularly reactive binder systems, optionally those which can largely cure or cure completely on the belt installation at temperatures below 250° C. PMT or even below 200° C. PMT. The content of binder(s) including reactive diluent(s) and/or crosslinking agent(s) optionally present can be varied within very wide ranges, in particular in the range from 10 to 90 wt. %, based on the solids content in the wet lacquer, preferably in the range from 12 to 75 wt. %, particularly preferably in the range from 14 to 60 wt. %, in particular in the range from 16 to 42 wt. %. The thinner the dry coating, the lower its particle content can be.

The systems and compounds which are known in principle can be employed for partial or complete curing. On the one hand, this can be a chemical crosslinking, optionally with deblocking of a masked (=blocked) curing agent or additionally optionally induced by heat. On the other hand the crosslinking can take place by means of free radicals by penetrating radiation, such as electron beams, or using photoinitiators and high-energy radiation, such as e.g. UV light. In the case of addition of at least one isocyanate, the free-radical curing can optionally also be followed by a chemical post-crosslinking. For this purpose, the at least one post-crosslinking compound d) which can be employed is at least one chosen from e.g. isocyanates, blocked isocyanates, isocyanurates, melamine resins or/and derivatives thereof. Photoinitiator(s) can, if present, be contained in the mixture in a content in the range from 0.2 to 18 wt. %, based on the solids content in the wet lacquer, preferably in the range from 0.5 to 8 wt. %.

Further additives which can be added are e.g. wetting agents, biocides, effect pigments, coloured pigments, colourless or white pigments, dyestuffs, defoamers, adhesion promoters, catalysts, corrosion inhibitors, polymerization inhibitors, silanes, siloxanes, suspending agents, surfactants or/and crosslinking agents. The content of additive(s) e), including the photoinitiator/photoinitiators optionally present, can be varied within wide ranges, in particular in the range from 0.1 to 25 wt. %, based on the solids content in the wet lacquer, preferably in the range from 0.5 to 15 wt. %, particularly preferably in the range from 0.8 to 10 wt. %, in particular in the range from 1 to 8 wt. %.

On the one hand, water or/and at least one organic solvent can be added to the mixture according to the invention, and on the other hand some or all of the content of water or/and organic solvent can be replaced by monomers as reactive diluents.

The object is moreover achieved by a process for producing a corrosion-resistant, viscoelastic coating comprising polymers and inorganic particles on a substrate, which is characterized in that a mixture according to the invention is applied to an optionally precoated substrate, optionally dried and at least partly crosslinked, as a result of which a coating of which the average layer thickness in the dry state is not more than 6 μm is produced.

It is preferable here for the average layer thickness in the dry state to be in the range from 0.2 to 6 μm, particularly preferably in the range from 1 to 5.8 μm, very particularly preferably from at least 1.5 μm or 2 μm and not more than 5.6 μm or 5.2 μm. In particular, the average layer thickness in the dry state can be about 2.4 μm, about 2.8 μm, about 3.2 μm, about 3.6 μm, about 3.9 μm, about 4.2 μm, about 4.6 μm, about 4.9 μm, about 5.2 μm or about 5.6 μm.

Preferably, all the components of the mixture after drying, in the partly or/and completely cured state, are resistant to water and weak alkaline media.

The mixture according to the invention can be applied, in particular, by knife-coating, rolling, atomizing or/and spraying. Such an application is preferably carried out on a strip, which can be precoated. Spraying is particularly preferred for application to components. The application should be as uniform as possible and as far as possible of the same thickness.

The mixture can preferably be dried in the temperature range from 20 to 320° C., it also being possible to use drying in air at room temperatures or only slightly elevated temperatures. If crosslinking at relatively low temperatures ensures a binder mixture for a sufficiently chemically stable coating, stoving at usually a high temperature is not absolutely necessary. Stoving of a thermally crosslinking polymer system can preferably be carried out in the temperature range from 100 to 320° C. Thermal crosslinking can also be combined with crosslinking initiated by free radicals, which in particular helps to generate particularly high degrees of crosslinking. In particular, thermal post-crosslinking after the crosslinking initiated by free radicals is advantageous here. The types of crosslinking, their combination and the polymer systems on which they are based are adequately known to the expert.

In the process according to the invention, the very soft or soft particles that are capable of sliding, such as e.g. graphite, can in each case not be ground or subjected to only low-intensity grinding before the addition to the mixture or in the mixture or/and in a portion of the mixture, since it is advantageous if the particles of the graphite or/and the aggregates of many coherent or caked-together individual particles are more or less, largely or completely retained in their size, which is preferably significantly greater than that of the electrically conductive hard particles, and as far as possible only slightly lose in size for the intermixing. It is advantageous if these particles are also distributed as homogeneously as possible, in particular in the organic binder system. The mixture according to the invention can be applied to strips, metal sheets, parts and composite components of at least two parts, which are joined e.g. by clinching, gluing or/and welding. The mixture according to the invention can be applied, in particular, on fast-running belt installations, such as e.g. galvanizing installations or/and coil coating installations, on single rolled sheet installations and in parts production, in assembling or in the repair field.

In the process according to the invention, the particle size passage value $d_{99}$ of the electrically conductive or/and semiconducting hard particles a) can be not substantially greater than, no greater than or only slightly smaller than the average thickness of the coating. The particle size passage value $d_{99}$ of the electrically conductive or/and semiconducting hard particles a) is advantageously in the range of $\pm 3$ μm, in particular in the range of $\pm 2$ μm, in the range of $\pm 1$ μm around the average thickness of the welding primer coating according to the invention, measured microscopically on a ground cross-section. It is particularly preferable for this particle size passage value $d_{99}$ to be somewhat smaller ($d_{99}$ up to 2.5, 1.5 or 0.8 μm smaller) than the average thickness of the welding primer coating according to the invention.

It is preferable, at an average thickness of the welding primer coating according to the invention of e.g. 5 μm, for the particle size passage value $d_{99}$ of the electrically conductive or/and semiconducting hard particles a) to be in the range from 5.5 to 4 μm and, at e.g. a thickness of 3 μm, for the particle size passage value $d_{99}$ of the electrically conductive or/and semiconducting hard particles a) to be in the range from 3.5 to 2 μm ($d_{99}$+1 and −2 μm or $d_{99}$+0.6 and −1.2 μm). The particle size passage value $d_{99}$ of the electrically conductive or/and semiconducting hard particles a) is preferably slightly less than the average thickness of the dry cured coating.

The electrical resistance of a coating according to the invention is advantageously measured on a steel coated on one side, where either only the coating according to the invention or a coating sequence of in each case a zinc or zinc alloy layer, a pretreatment layer and a welding primer layer is applied to the steel sheet.

On measurement of the volume resistance, using a laboratory apparatus corresponding to DVS leaflet 2929, of a metal sheet provided on one side at least with a welding primer layer and optionally also coated beforehand with e.g. zinc or/and a pretreatment, the coating according to the invention preferably has an electrical resistance of not more than 1,000 mΩ, particularly preferably of not more than 300 mΩ, very particularly preferably of not more than 80 mΩ.

The electrically conductive or/and semiconducting particles a) have, when used as the sole particles in a polymeric matrix having a content of particles a) of 15 wt. %, based on the solids content in the substantially cured state, bonded homogeneously into a corresponding polymeric base, such as a polymeric primer composition, an electrical resistance preferably of not more than $2 \times 10^5 \Omega$, preferably of not more than $2 \times 10^4 \Omega$, measured in accordance with DIN 53596, for a use without resistance welding and an electrical resistance preferably of not more than $2 \times 10^4 \Omega$, particularly preferably of not more than $1 \times 10^4 \Omega$, very particularly preferably of not more than $2 \times 10^3 \Omega$, in particular of not more than $2 \times 10^2 \Omega$ for a use with resistance welding, the average layer thickness preferably being kept in the range from 3 to 6 μm.

In the process according to the invention, the mixture applied to the substrate can be dried, stoved, irradiated with free radicals or/and heated in order to form a thoroughly crosslinked, corrosion-resistant, viscoelastic coating. In the case of a content of post-crosslinking compounds, an even greater degree of post-crosslinking can also be achieved by this means due to thermal stimulation, especially if crosslinking with free-radical radiation, in particular UV radiation, has been initiated beforehand. The pigmentation is preferably present in the polymeric matrix with a good distribution. Furthermore, it is preferable for the degree of crosslinking of the polymeric matrix to be at least 70%, preferably at least 80%, particularly preferably at least 90%. In thermally curing-polymer systems, the degree of crosslinking can in some cases also be adjusted via the stoving temperature and duration or/and via the content of catalysts.

It is moreover preferable for the coating according to the invention on a steel sheet to be corrosion-resistant so that it withstands at least 10, preferably at least 16, particularly preferably at least 20 cycles of a corrosion protection alternating test in accordance with VDA 621-415 without the occurrence of red rust.

In the process according to the invention, a coating having an average thickness of less than 6 μm, in particular of less than 5 μm, preferably of less than 4 μm and particularly preferably of less than 3 μm, measured in the dry state microscopically on a ground cross-section, can be produced.

In the process according to the invention, the mixture can be free or substantially free from organic lubricants, such as e.g. based on PTFE, silicone or/and oil, and free from inorganic or/and organic acids or/and heavy metals and other cations, such as e.g. arsenic, lead, cadmium, chromium, cobalt, copper or/and nickel. Preferably, all or most of these substances are not intentionally added. Under certain circumstances, acids could increase the water uptake of the coating. Organic corrosion inhibitors should preferably not be added in an overdose.

In the process according to the invention, the substrate can comprise at least one metal or/and at least one alloy and can optionally be precoated and in particular comprise a sheet of aluminium, of an aluminium, iron or magnesium alloy or of steel, such as e.g. automobile steels.

In the process according to the invention, the mixture according to the invention can be applied directly to a pretreatment coating. The at least one pretreatment coating in this context can be, in particular, one based on or having a content of in each case at least one silicon, titanium or/and zirconium compound, based on a complex fluoride compound, such as e.g. based on $TiF_6$, based on a phosphating coating, based on an alkaline passivation, such as having a content of at least one metal oxide, such as e.g. a passivation based on aluminium, iron, cobalt, manganese, nickel or/and zinc oxide, or/and based on a pretreatment coating comprising polymer, very fine particles and optionally at least one compound of at least one IIIB/IVB element, such as e.g. La, Y, lanthanides, such as Ce etc., Ti, Zr, Hf or/and phosphate.

The object is furthermore achieved with an electrically conductive or semiconducting coating comprising polymers and inorganic particles which is produced with a mixture according to the invention or/and produced by the process according to the invention.

The coating according to the invention can be used as a welding primer, as a protective coating during shaping or/and joining, as corrosion protection of surfaces or in the edge, seam or/and welded seam region, as protection instead of a hollow cavity seal or/and a seam seal, in particular for vehicle construction or aircraft construction.

EXAMPLES AND COMPARISON EXAMPLES

The following examples (E) which are reproduced in the tables explain preferred embodiments of the mixture, process and coating according to the invention.

The experiments for the examples according to the invention and for the comparison examples were largely carried out with the conventional raw materials, units and process steps in the lacquer industry, apart from individual pigments and individual grinding processes.

In the preparation of the mixtures, all the binders were initially introduced into the mixing vessel and diluted with the organic solvent or/and water, the additives and the corrosion protection pigments were then added and the mixture which existed was ground. Thereafter, the particles a), optionally already ground separately, were added and dispersed thoroughly with a dissolver. In the examples according to the invention, the phosphides were subjected to separate intense grinding before addition to the mixture, so that the passage value $d_{80}$ of the individual particle size distributions of the various particle types for examples with an average dry layer thickness of about 5 μm was in the range from 4.2 to 4.9 μm, but for the examples with an average dry layer thickness of about 3 μm was in the range from 2.3 to 2.8 μm. Finally, the viscosity was adjusted with water or/and organic solvent to a flow time in the flow cup in the range from 30 to 60 s in accordance with ISO/2431 (5 mm). This mixture was applied by means of a laboratory coater or applicator knife to hot-dip galvanized or electrolytically galvanized and subsequently pretreated metal sheets of less than 1 mm thick. The metal sheets coated in this manner were dried at 80° C. and, in the case of thermally cross-linking systems, stoved at temperatures of about 160° C. PMT in examples 1 to 12 and of 240° C. PMT in examples 13 to 24. In the case of radiation-curing systems, curing was initiated with UV radiation. The post-crosslinking compound was optionally added directly before the coating and stimulated to further crosslinking by heating to temperatures of approx. 100° C.

The compositions in table 1 are calculated to 100 parts by weight from the solids contents of the various additives, including the added water and organic solvent (wee lacquer). The table shows the diversity of compositions with different binder systems and different pigment types and contents. Table 2 shows the properties of the coatings produced with the mixtures of table 1.

The particle size distributions were measured with a Mastersizer of type S from Malvern Instruments, a suspension being established by addition of a random sample of the particles to be measured and of one to two small drops of surfactant mixture (Pril®) to deionized water, this suspension additionally being dispersed by the action of ultrasound with the source of ultrasound incorporated in the apparatus, initially at an intensity of approx. 80% for approx. 5 s and then at an intensity of approx. 30% for approx. 25 s. To establish the suspension and for the measurement, a pump setting of approx. 50% and a stirrer setting of approx. 40% were chosen, and the measurement was carried out in the "obscuration" setting (approx. 20%).

The experiments show that optimization of the coating-according to the invention between shapability, low abrasion during shaping, chemical stability, corrosion resistance and weldability during resistance welding is in no way easy. While the additions of very soft or soft, inorganic, electrically conductive or/and semiconducting particles that are capable of sliding, including alloy particles, or of metallic zinc help to improve the shapability, a content of metallic particles such as metallic zinc, graphite or/and carbon black can precisely reduce the corrosion resistance, in some cases significantly. The particular electrical conductivity and the contents of the various types of particles a) substantially co-determine the weldability, the electrical conductivity having a somewhat lower place value in particularly thin films. The transition from zinc to alloys or to copper produces substantial improvements in the corrosion resistance. Replacement of (some of) the iron phosphide partly reduces the hardness and where appropriate also the strength of the coating, but can easily be compensated elsewhere in respect of electrical conductivity and strength of the coating. Many alternatives are thus shown for providing particularly thin coatings for severe shaping.

Table 3 shows mixtures using tungsten powder. Tungsten typically showed an electrical resistance which—at a comparable purity—is of the order of magnitude at least about 5% lower than that of zinc. In examples 41 to 52, a tungsten particle grade of technical purity which was ground down still further was used. It was found here that the tungsten powder could be ground very readily and felt very soft. It was found—against the expected properties—that the combination of tungsten powder with e.g. zinc powder or/and powder of an aluminium alloy or/and zinc alloy resulted in an unexpectedly high good suitability for welding and a good flexibility of the cured coating. A mixture with electrically conductive particles of zinc and tungsten in the weight ratio of about 1:1 to about 1:2 resulted here in a suitability for welding similar to, instead of this, iron phosphide alone. The ground tungsten powder added had a particle size distribution with an average particle size $d_{50}$ of 2.4 μm, $d_{80}$ of 5.5 μm and $d_{99}$ of 9.0 μm. The zinc powder added had a particle size distribution with an average particle size $d_{50}$ of 3.7 μm, $d_{80}$ of 5.7 μm and $d_{99}$ of 10.5 μm. The powder of the particularly corrosion-resistant magnesium-containing zinc alloy added had a particle size distribution with an average particle size $d_{50}$ of 4.2 μm, $d_{80}$ of 5.6 μm and $d_{99}$ of 9.2 μm. The powder of the corrosion-resistant aluminium alloy added had a particle size distribution with an average particle size $d_{50}$ of 3.9 μm, $d_{80}$ of 5.6 μm and $d_{99}$ of 10.2 μm. The iron phosphide powder added had a particle size distribution with an average particle size $d_{50}$ of 3.8 μm, $d_{80}$ of 5.1 μm and $d_{99}$ of 8.8 μm. Instead of the tungsten powder, it was also possible to employ powders of molybdenum, tantalum or/and niobium with similarly good success.

TABLE 1

Composition of the examples according to the invention, based on the solids contents in the wet lacquer

| Examples | E 1 | E 2 | E 3 | E 4 | E 5 | E 6 | E 7 | E 8 | E 9 | E 10 | E 11 | E 12 |
|---|---|---|---|---|---|---|---|---|---|---|---|---|
| Thermal binders | | | | | | | | | | | | |
| 1.a. Aqueous emulsion of an epoxy resin "type 7" (bisphenol A) | 5.00 | 5.00 | 5.00 | 5.00 | 5.00 | 5.00 | 6.50 | 6.50 | 6.50 | 6.50 | 6.50 | 6.50 |
| 1.b. Aqueous emulsion of a flexibilized epoxy resin "type 1" | 4.00 | 4.00 | 4.00 | 4.00 | 4.00 | 4.00 | 5.20 | 5.20 | 5.20 | 5.20 | 5.20 | 5.20 |
| 1.c. Aqueous emulsion of an HDI isocyanate, masked | 6.00 | 6.00 | 6.00 | 6.00 | 6.00 | 6.00 | 7.75 | 7.75 | 7.75 | 7.75 | 7.75 | 7.75 |
| Additives | | | | | | | | | | | | |
| 2.a. Polysiloxane | 0.20 | 0.20 | 0.20 | 0.20 | 0.20 | 0.20 | 0.20 | 0.20 | 0.20 | 0.20 | 0.20 | 0.20 |
| 2.b. 2-Amino-2-methyl-1-propanol | 0.25 | 0.25 | 0.25 | 0.25 | 0.25 | 0.25 | 0.25 | 0.25 | 0.25 | 0.25 | 0.25 | 0.25 |
| Electrically conductive or semiconducting elements/alloys/compounds | | | | | | | | | | | | |
| 3.a. Iron phosphide | 27.50 | — | — | — | 20.00 | — | 25.00 | — | — | — | 17.50 | — |
| 3.b. Copper | — | 27.50 | — | — | 10.00 | 7.50 | — | 25.00 | — | — | 7.50 | 6.00 |
| 3.c. Aluminium alloy | — | — | 27.50 | — | — | 10.00 | — | — | 25.00 | — | — | 7.50 |
| 3.d. tert. Amine *polyaniline derivative | — | — | — | 27.50 | — | *10.00 | — | — | — | 25.00 | — | *7.50 |
| 3.e. Zinc alloy | 30.00 | 30.00 | 30.00 | 30.00 | 27.50 | 30.00 | 27.50 | 27.50 | 27.50 | 27.50 | 25.00 | 25.00 |
| Corrosion protection pigments | | | | | | | | | | | | |
| 4.a. Ca-modified silicate pigment | 5.00 | 5.00 | 5.00 | 5.00 | 5.00 | 5.00 | 5.00 | 5.00 | 5.00 | 5.00 | 5.00 | 5.00 |
| 4.b. Alkylammonium salt | 1.00 | 1.00 | 1.00 | 1.00 | 1.00 | 1.00 | 1.00 | 1.00 | 1.00 | 1.00 | 1.00 | 1.00 |
| Solvent | | | | | | | | | | | | |
| 5.a. Completely demineralized water | 6.00 | 6.00 | 6.00 | 6.00 | 6.00 | 6.00 | 6.00 | 6.00 | 6.00 | 6.00 | 6.00 | 6.00 |
| 5.b. Total content of org. solvent | 15.05 | 15.05 | 15.05 | 15.05 | 15.05 | 15.05 | 15.60 | 15.60 | 15.60 | 15.60 | 15.20 | 22.70 |

| Examples | E 13 | E 14 | E 15 | E 16 | E 17 | E 18 | E 19 | E 20 | E 21 | E 22 | E 23 | E 24 |
|---|---|---|---|---|---|---|---|---|---|---|---|---|
| Thermal binders | | | | | | | | | | | | |
| 1.a. Semi-solid epoxy resin | 8.00 | 8.00 | 8.00 | 8.00 | 8.00 | 8.00 | 10.00 | 10.00 | 10.00 | 10.00 | 10.00 | 10.00 |
| 1.b. Emulsified HDI, masked | 6.00 | 6.00 | 6.00 | 6.00 | 6.00 | 6.00 | 6.00 | 6.00 | 6.00 | 6.00 | 6.00 | 6.00 |
| Additives: defoamers and wetting agents | | | | | | | | | | | | |
| 2.a. Polysiloxane | 0.05 | 0.05 | 0.05 | 0.05 | 0.05 | 0.05 | 0.05 | 0.05 | 0.05 | 0.05 | 0.05 | 0.05 |
| 2.b. Carboxylic acid polymer | 0.1 | 0.1 | 0.1 | 0.1 | 0.1 | 0.1 | 0.1 | 0.1 | 0.1 | 0.1 | 0.1 | 0.1 |
| Electrically conductive or semiconducting elements/alloys/compounds | | | | | | | | | | | | |
| 3.a. Iron phosphide | 27.50 | — | — | — | 20.00 | — | 25.00 | — | — | — | 17.50 | — |
| 3.b. Copper | — | 27.50 | — | — | 10.00 | 7.50 | — | 25.00 | — | — | 7.50 | 6.00 |
| 3.c. Aluminium alloy | — | — | 27.50 | — | — | 10.00 | — | — | 25.00 | — | — | 7.50 |
| 3.d. tert. Amine *polyaniline derivative | — | — | — | 27.50 | — | *10.00 | — | — | — | 25.00 | — | *7.50 |
| 3.e. Zinc alloy | 30.00 | 30.00 | 30.00 | 30.00 | 27.50 | 30.00 | 27.50 | 27.50 | 27.50 | 27.50 | 25.00 | 25.00 |
| Corrosion protection pigments | | | | | | | | | | | | |
| 4.a. Ca-modified silicate pigment | 5.00 | 5.00 | 5.00 | 5.00 | 5.00 | 5.00 | 5.00 | 5.00 | 5.00 | 5.00 | 5.00 | 5.00 |
| 4.b. Alkylammonium salt | 1.00 | 1.00 | 1.00 | 1.00 | 1.00 | 1.00 | 1.00 | 1.00 | 1.00 | 1.00 | 1.00 | 1.00 |
| Solvent | | | | | | | | | | | | |
| 5.a. Total content of org. solvent | 22.35 | 22.35 | 22.35 | 22.35 | 22.35 | 22.35 | 25.35 | 25.35 | 25.35 | 25.35 | 27.85 | 31.85 |

| Examples | E 25 | E 26 | E 27 | E 28 | E 29 | E 30 | E 31 | E 32 | E 33 | E 34 | E 35 | E 36 |
|---|---|---|---|---|---|---|---|---|---|---|---|---|
| UV binders, optionally with post-crosslinking | | | | | | | | | | | | |
| 1.a. Urethane acrylate, curing by free radicals | 15.00 | 12.50 | 12.50 | 12.50 | 12.50 | 12.50 | 14.00 | 14.00 | 14.00 | 14.00 | 14.00 | 14.00 |
| 1.b. Polyfunctional isocyanurate based on HDI | — | 2.50 | 2.50 | 2.50 | 2.50 | 2.50 | 2.75 | 2.75 | 2.75 | 2.75 | 2.75 | 2.75 |

TABLE 1-continued

Composition of the examples according to the invention, based on the solids contents in the wet lacquer

Additives

| | | | | | | | | | | | | |
|---|---|---|---|---|---|---|---|---|---|---|---|---|
| 2 a. Polysiloxane | 0.25 | 0.25 | 0.25 | 0.25 | 0.25 | 0.25 | 0.25 | 0.25 | 0.25 | 0.25 | 0.25 | 0.25 |
| 2 b. 1-Hydroxy-cyclohexyl phenyl ketone | 1.50 | 1.50 | 1.50 | 1.50 | 1.50 | 1.50 | 1.50 | 1.50 | 1.50 | 1.50 | 1.50 | 1.50 |
| 2 c. Bis(2,6-dimethoxybenzyl)-2,4,4-trimethylpentylphosphine oxide | 0.75 | 0.75 | 0.75 | 0.75 | 0.75 | 0.75 | 0.75 | 0.75 | 0.75 | 0.75 | 0.75 | 0.75 |

Electrically conductive or semiconducting elements/alloys/compounds

| | | | | | | | | | | | | |
|---|---|---|---|---|---|---|---|---|---|---|---|---|
| 3.a. Iron phosphide | 27.50 | — | — | — | 20.00 | — | 25.00 | — | — | — | 17.50 | — |
| 3.b. Copper | — | 27.50 | — | — | 10.00 | 7.50 | — | 25.00 | — | — | 7.50 | 6.00 |
| 3.c. Aluminium alloy | — | — | 27.50 | — | — | 10.00 | — | — | 25.00 | — | — | 7.50 |
| 3.d. tert. Amine *polyaniline derivative | — | — | — | 27.50 | — | *10.00 | — | — | — | 25.00 | — | *7.50 |
| 3.e. Zinc alloy | 30.00 | 30.00 | 30.00 | 30.00 | 27.50 | 30.00 | 27.50 | 27.50 | 27.50 | 27.50 | 25.00 | 25.00 |

Corrosion protection pigments

| | | | | | | | | | | | | |
|---|---|---|---|---|---|---|---|---|---|---|---|---|
| 4.a. Ca-modified silicate pigment | 2.50 | 2.50 | 2.50 | 2.50 | 2.50 | 2.50 | 2.50 | 2.50 | 2.50 | 2.50 | 2.50 | 2.50 |

Solvent

| | | | | | | | | | | | | |
|---|---|---|---|---|---|---|---|---|---|---|---|---|
| 5.b. Total content of org. solvent | 22.50 | 22.50 | 22.50 | 22.50 | 22.50 | 22.50 | 25.75 | 25.75 | 25.75 | 25.75 | 28.25 | 32.25 |

TABLE 2

Properties of the coatings according to the invention on variation of the layer composition, at 160 or 240° C. PMT

| Properties | E 1 | E 2 | E 3 | E 4 | E 5 | E 6 | E 7 | E 8 |
|---|---|---|---|---|---|---|---|---|
| Dry film thickness in μm | 5 | 5 | 5 | 5 | 5 | 5 | 3 | 3 |
| Electrical conductivity of the coating | high | high | low | high | high | high | very high | very high |
| Elasticity of the coating in mm: cupping test acc. to DIN EN ISO 1520 | 8.6 | 8.4 | 8.6 | 8.2 | 8.8 | 8.4 | 9.2 | 9.0 |
| Mechanical strength of the coating | high | high | very high | high | high | high | very high | very high |
| Gluability by the peel test with epoxy resin adhesive, visual: adhesive/cohesive fracture | 80/20 | 60/40 | 50/50 | 50/50 | 50/50 | 40/60 | 100/0 | 90/10 |
| Defects after shaping by bending over an edge | none | none | slight cracks | none | none | slight cracks | none | none |
| Defects on pressing | none | none | none | none | none | none | none | none |
| Tool wear on pressing | very low | very low | very low | very low | very low | very low | except. low | except. low |

| Properties | E 9 | E 10 | E 11 | E 12 | E 13 | E 14 | E 15 | E 16 |
|---|---|---|---|---|---|---|---|---|
| Dry film thickness in μm | 3 | 3 | 3 | 3 | 5 | 5 | 5 | 5 |
| Electrical conductivity of the coating | low | high | very high | low | high | high | average | low |
| Elasticity of the coating in mm: cupping test acc. to DIN EN ISO 1520 | 8.6 | 8.5 | 8.8 | 7.8 | 9.0 | 8.4 | 8.4 | 8.2 |
| Mechanical strength of the coating | high | low | very high | very high | high | high | high | high |
| Gluability by the peel test with epoxy resin adhesive, visual: adhesive/cohesive fracture | 40/60 | 40/60 | 60/40 | 30/70 | 90/10 | 50/50 | 30/70 | 30/70 |
| Defects after shaping by bending over an edge | slight cracks | none | none | slight cracks | none | none | slight cracks | slight cracks |
| Defects on pressing | slight detachment | slight detachment | none | none | none | none | none | slight detachment |
| Tool wear on pressing | very low | low | low | low | low | low | low | very low |

TABLE 2-continued

Properties of the coatings according to the invention on variation of the layer composition, at 160 or 240° C. PMT

| Properties | E 17 | E 18 | E 19 | E 20 | E 21 | E 22 | E 23 | E 24 |
|---|---|---|---|---|---|---|---|---|
| Dry film thickness in µm | 5 | 5 | 3 | 3 | 3 | 3 | 3 | 3 |
| Electrical conductivity of the coating | high | high | very high | high | average | low | very high | very low |
| Elasticity of the coating in mm: cupping test acc. to DIN EN ISO 1520 | 9.0 | 7.8 | 9.4 | 8.4 | 8.8 | 7.9 | 9.0 | 7.4 |
| Mechanical strength of the coating | high | high | high | high | high | low | very high | high |
| Gluability by the peel test with epoxy resin adhesive, visual: adhesive/cohesive fracture | 40/60 | 30/70 | 90/10 | 40/60 | 20/80 | 20/80 | 50/50 | 30/70 |
| Defects after shaping by bending over an edge | none | slight cracks | none | none | slight cracks | none | none | slight cracks |
| Defects on pressing | none | slight detachment | none | none | slight detachment | slight detachment | none | slight detachment |
| Tool wear on pressing | low | low | very low | low | low | low | low | low |

| Properties | E 25 | E 26 | E 27 | E 28 | E 29 | E 30 | E 31 | E 32 |
|---|---|---|---|---|---|---|---|---|
| Dry film thickness in µm | 5 | 5 | 5 | 5 | 5 | 5 | 3 | 3 |
| Electrical conductivity of the coating | high | high | low | low | high | low | very high | high |
| Elasticity of the coating in mm: cupping test acc. to DIN EN ISO 1520 | 9.4 | 9.0 | 7.9 | 7.8 | 8.7 | 8.2 | 8.9 | 9.0 |
| Mechanical strength of the coating | high | high | high | low | high | high | high | high |
| Gluability by the peel test with epoxy resin adhesive, visual: adhesive/cohesive fracture | 80/20 | 50/50 | 40/60 | 20/80 | 40/60 | 50/50 | 100/0 | 40/60 |
| Defects after shaping by bending over an edge | none | none | slight cracks | slight cracks | none | none | none | none |
| Defects on pressing | none | none | none | slight detachment | none | none | none | none |
| Tool wear on pressing | low | low | low | low | low | low | very low | low |

| Properties | E 33 | E 34 | E 35 | E 36 |
|---|---|---|---|---|
| Dry film thickness in µm | 3 | 3 | 3 | 3 |
| Electrical conductivity of the coating | low | low | very high | low |
| Elasticity of the coating in mm: cupping test acc. to DIN EN ISO 1520 | 7.2 | 8.6 | 9.2 | 8.8 |
| Mechanical strength of the coating | high | low | high | high |
| Gluability by the peel test with epoxy resin adhesive, visual: adhesive/cohesive fracture | 30/70 | 50/50 | 60/40 | 30/70 |
| Defects after shaping by bending over an edge | slight cracks | none | none | none |
| Defects on pressing | slight detachment | none | none | none |
| Tool wear on pressing | low | low | low | low |

TABLE 3

Composition of the examples according to the invention based on the solids contents in the wet lacquer

| Examples | E 41 | E 42 | E 43 | E 44 | E 45 | E 46 | E 47 | E 48 | E 49 | E 50 | E 51 | E 52 |
|---|---|---|---|---|---|---|---|---|---|---|---|---|
| Thermal binders | | | | | | | | | | | | |
| 1.a. Aqueous emulsion of an epoxy resin "type 7" (bisphenol A) | 6.50 | 6.50 | 6.50 | 6.50 | 6.50 | 6.50 | 6.50 | 6.50 | 6.50 | 6.50 | 6.50 | 6.50 |
| 1.b. Aqueous emulsion of a flexibilized epoxy resin "type 1" | 5.20 | 5.20 | 5.20 | 5.20 | 5.20 | 5.20 | 5.20 | 5.20 | 5.20 | 5.20 | 5.20 | 5.20 |
| 1.c. Aqueous emulsion of an HDI isocyanate, masked | 7.75 | 7.75 | 7.75 | 7.75 | 7.75 | 7.75 | 7.75 | 7.75 | 7.75 | 7.75 | 7.75 | 7.75 |
| Additives | | | | | | | | | | | | |
| 2.a. Polysiloxane | 0.20 | 0.20 | 0.20 | 0.20 | 0.20 | 0.20 | 0.20 | 0.20 | 0.20 | 0.20 | 0.20 | 0.20 |
| 2.b. 2-Amino-2-methyl-1-propanol | 0.25 | 0.25 | 0.25 | 0.25 | 0.25 | 0.25 | 0.25 | 0.25 | 0.25 | 0.25 | 0.25 | 0.25 |
| Electrically conductive or semiconducting elements/alloys/compounds | | | | | | | | | | | | |
| 3.a. Iron phosphide | — | — | — | — | — | — | 25.00 | 15.00 | 5.00 | — | — | — |
| 3.b. Tungsten | 30.00 | 22.50 | 15.00 | 12.00 | 8.00 | 5.00 | 7.36 | 11.54 | 13.47 | 15.00 | 15.00 | 15.00 |
| 3.c. Aluminium alloy | — | — | — | — | — | — | — | — | — | — | 17.05 | 34.10 |
| 3.d. Zinc | 19.10 | 26.60 | 34.10 | 37.10 | 41.10 | 44.10 | 16.74 | 22.56 | 30.63 | — | — | — |
| 3.e. Zinc alloy | — | — | — | — | — | — | — | — | — | 34.10 | 17.05 | — |
| Corrosion protection pigments | | | | | | | | | | | | |
| 4.a. Ca-modified silicate pigment | 5.00 | 5.00 | 5.00 | 5.00 | 5.00 | 5.00 | 5.00 | 5.00 | 5.00 | 5.00 | 5.00 | 5.00 |
| 4.b. Alkylammonium salt | 1.00 | 1.00 | 1.00 | 1.00 | 1.00 | 1.00 | 1.00 | 1.00 | 1.00 | 1.00 | 1.00 | 1.00 |
| Solvent | | | | | | | | | | | | |
| 5.a. Completely demineralized water | — | — | — | — | — | — | — | — | — | 5.00 | 5.00 | 5.00 |
| 5.b. Total content of org. solvent | 25.00 | 25.00 | 25.00 | 25.00 | 25.00 | 25.00 | 25.00 | 25.00 | 25.00 | 20.00 | 20.00 | 20.00 |

The invention claimed is:

1. A mixture comprising:
    A) at least one electrically conductive or semiconducting compound comprising
        a) an electrically conductive or semiconductive tin metal or a tin alloy in an amount of from 0.5 to 60% by weight of the mixture, and at least one of b) or c), wherein;
        b) is at least one electrically conductive or semiconducting polymeric compound or a mixture thereon; and
        c) is at least one electrically conductive or semiconducting amine- or ammonium-containing compound; and
    B) is at least one binder;
    C) is at least one crosslinking agent, a photoinitiator, or a mixture thereof whereby the content of said binder or crosslinking agent is in the range of from 16 to 42% by weight, and
    D) is at least one of an organic solvent or water;
    wherein the total weight of component A) is from 0.5 to 70 wt. % based on the total weight of the mixture, wherein the mixture is free of carbon black and wherein a) is capable of sliding and wherein the mixture is a liquid and is free of chromium.

2. A mixture according to claim 1, wherein a mixture of all electrically conductive or semiconducting particles a) has an average particle size $d_{50}$ in the range from 0.1 to 4.0 microns.

3. A mixture according to claim 1, wherein a mixture of all electrically conductive or semiconducting particles a) has an average particle size $d_{50}$ in the range from 0.2 to 4.0 microns.

4. A mixture according to claim 1, wherein a mixture of all electrically conductive or semiconducting particles a) has an average particle size $d_{50}$ in the range from 0.1 to 4.5 microns.

5. A mixture according to claim 3, wherein said average particle size $d_{50}$ is 3.5 microns.

6. A mixture according to claim 1, wherein particles A) have an average particle size $d_{50}$ of from 0.2 to 3.5 microns.

7. A mixture according to claim 1 wherein particles A have an average particle size d50 of 0.2 microns.

8. A mixture according to claim 1, further comprising metallic particles of at least one of aluminum, tungsten, zinc or alloys thereof.

9. A mixture according to claim 1, wherein the mixture includes a reactive binder system which can substantially or completely cure on a belt installation at a temperature below 250° C. PMT.

10. A mixture according to claim 1, wherein component a) comprises molybdenum.

11. A mixture according to claim 1, wherein compound b) is at least one of polyaniline, polypyrrote, polythiophenene or a mixture thereof.

12. A mixture according to claim 1, containing at least one electrically conductive or semiconducting compound c), that is a tertiary amine, an ammonium compound or derivative thereof.

13. A mixture according to claim 1, comprising not more than 1.5 wt. % of wax or of substances having wax-like properties.

14. A process comprising applying the mixture of claim 1 to a substrate, optionally drying or at least partly crosslinking the mixture as a result of which a coating of which the average layer thickness in the dry state is not more than 6 μm, measured in the dry state microscopically on a ground cross-section, is produced on the substrate, wherein the process is chromium free, to yield a coated substrate.

15. A process according to claim 14, wherein the at least one electrically conductive or semiconducting metallic particles a) are ground by themselves.

16. A process according to claim 14, wherein the at least one electrically or conductive semiconducting metallic particles a) has a particle passage value $d_{80}$ which is no greater than the layer thickness of the dry coating produced therewith.

17. A process according to claim 14, wherein the at least one electrically or conductive semiconducting metallic particles are ground, and over-sized particles are predominantly comminuted, so that a narrower particle size distribution arises.

18. A process according to claim 14, wherein the particle size passage value $d_{99}$ of the electrically conductive or semiconducting metallic particles a) is not substantially greater than, no greater than or only slightly less than the average thickness of the coating.

19. A process according to claim 14, wherein the applied mixture is dried, stoved, irradiated with free radicals or heated in order to form a thoroughly crosslinked, corrosion-resistant, viscoelastic coating.

20. A process according to claim 14, wherein the resultant coating has a thickness of less than 6 μm.

21. A process according to claim 14, wherein the mixture is free or substantially free from organic lubricants.

22. A process according to claim 14, wherein the substrate comprises at least one metal or metal alloy.

23. A process according to claim 14, wherein the mixture according to the invention is applied directly to a pretreatment coating or said substrate.

24. The coated substrate prepared by the process of claim 14.

25. The coated substrate of claim 24, wherein the substrate is metal also.

26. A process according to claim 14, wherein said mixture is free from at least one of PTFE, silicone, inorganic acids, silicone oil, organic acids, heavy metals, arsenic, lead, cadmium, chromium, cobalt, copper or nickel.

27. A process according to claim 14, wherein said substrate comprises at least one of aluminum, iron, magnesium or steel.

28. The mixture of claim 1, wherein a) is tin metal.

29. The mixture of claim 1, wherein a) is tin alloy.

30. The mixture of claim 1, further comprising E) at least one component chosen from d), f) or g), wherein d) is at least one post-crosslinking compound, f) is at least one corrosion protection pigment based on a silicate, whereby the corrosion protection pigments have an average particle size $d_{50}$ in the range from 0.01 to 5 micron; and g) at least one of corrosion inhibitor which are not present in particle form.

31. A mixture according to claim 30, wherein the sum of the weight content of a) relative to the sum of the total pigmentation $\Sigma((a)+(f))$ is 30 to 99 wt. %.

32. A mixture according to claim 30, wherein the corrosion protection particles f) have an average particle size $d_{50}$ of 5 μm.

33. A mixture according to claim 30, wherein the corrosion protection particles f) have the particle size passage value $d_{80}$ in the range from 0.03 to 6 μm.

34. The mixture of claim 1, further comprising metal particles selected from the group consisting of tungsten, tantalum and niobium or an alloy thereof.

35. A process comprising the steps of:

applying the mixture of claim 34 to a substrate; and drying or at least partly crosslinking the mixture to yield a coated substrate having, wherein the dry coating on the substrate has an average layer thickness in the dry state of not more than 6 μm, measured microscopically on a ground cross-section, and wherein the process is chromium free.

* * * * *